Figure 1:
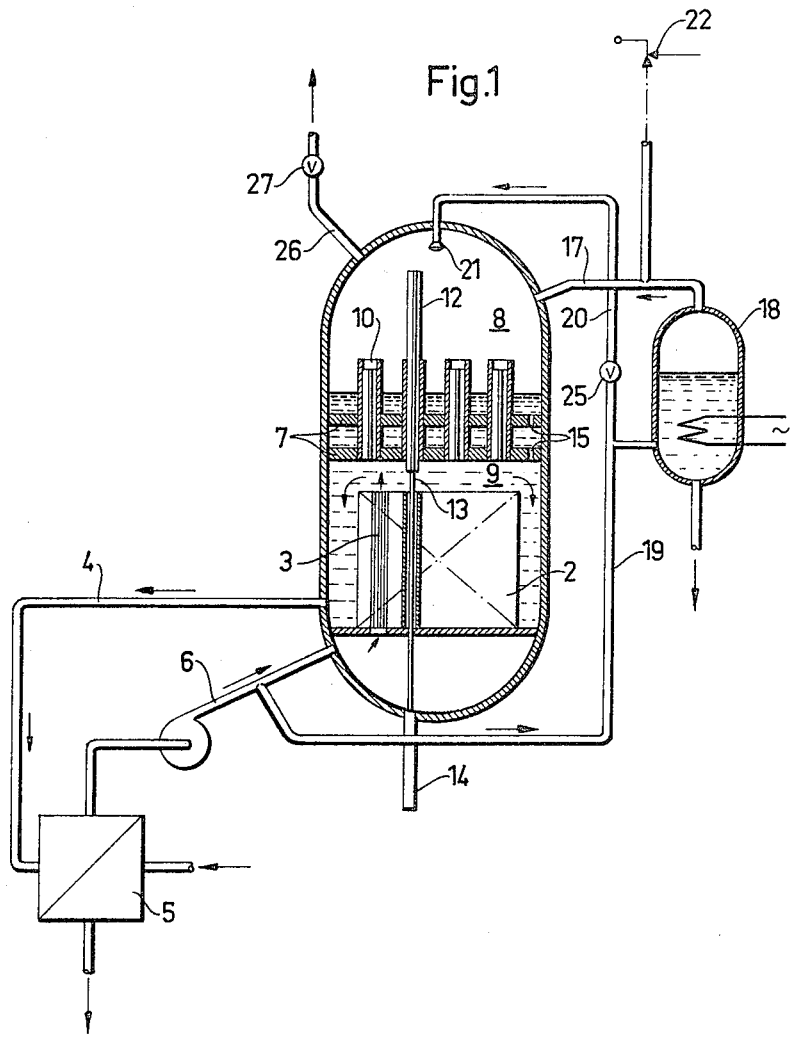

United States Patent Office 3,284,311
Patented Nov. 8, 1966

3,284,311
INTERNAL PRESSURIZATION OF A NUCLEAR REACTOR OF THE PRESSURIZED WATER TYPE
Brian McHugh, Lidingo, Sweden, assignor to Aktiebolaget Atomenergi, Stockholm, Sweden, a Swedish company
Filed Dec. 14, 1964, Ser. No. 417,893
4 Claims. (Cl. 176—54)

The invention is concerned with the internal pressurization of a nuclear reactor of the pressurized water type, i.e., a nuclear reactor in which pressurized water is heated without bulk boiling. In a nuclear reactor of this type it is necessary to maintain an overpressure in the coolant system to prevent bulk boiling of the cooling water in the core of the reactor. It is also necessary to provide a surge volume in the coolant system to accommodate the changes in water volume arising from the changes in plant temperature which occur during operation of the reactor.

Various ways of producing an overpressure necessary to prevent boiling in the core of a nuclear reactor have been suggested. German Patent No. 1,027,338 suggests maintaining an overpressure by means of a pump. It is a draw-back of this suggested method that the reactor tank must be designed to stand a high pressure difference between different portions of the tank. German Patent No. 1,055,140 suggests creating an overpressure by supplying a compressed gas to the reactor tank. It is a draw-back of this suggested method that trouble may arise from the compressed gas dissolving in the water, for instance cavitation in the pump circulating the water through the coolant system.

It is an object of the invention to provide simple and reliable means for maintaining an overpressure in a nuclear reactor of the type referred to above. It is another object of the invention to provide means for controlling said overpressure, allowing the overpressure to be rapidly increased and decreased, as desired. It is a particular object of the invention to produce said overpressure by supplying steam to the reactor tank, while providing means for reducing the heat transfer from said steam to the water in the reactor. Other objects will be apparent from the following description of the invention.

The invention is based upon the idea that the surge volume referred to above, i.e., the volume allowing the cooling water to expand, shall be placed inside the reactor pressure tank, above the region occupied by the nuclear fuel, and that a temperature difference shall be maintained between said surge volume and the cooling water in the reactor by supplying to said surge volume steam having a temperature higher than that of the water in the reactor. The cooling water in the reactor will be prevented from boiling as long as it is in contact with saturated steam having a higher temperature. In order to prevent the condensation of this steam at a rate obviating the maintenance of a significant temperature difference between the surge volume and the cooling water a thermal barrier shall be arranged between the surge volume and the water volume of the reactor tank. Said thermal barrier allows the pressure in the surge volume to be held at a higher value than that corresponding to the temperature of the cooling water.

It is obvious that the use of steam as a pressurization agent depends on the ability to minimize the heat loss through the thermal barrier. This is rendered difficult by the need to allow water to pass freely between the surge volume and the water volume, depending on the volume changes of the water. According to one embodiment of the invention vertical pipes shall be provided so as to pass through the thermal barrier and to extend some distance above the thermal barrier issuing above the water surface. Said vertical pipes allow a free communication between the surge volume and the water volume, while they permit only an insignificant transfer of heat from the surge volume to the water volume. Said transfer of heat can be further reduced by providing partitions in said pipes, said partitions dividing the pipes into a plurality of narrow, parallel channels.

According to a preferred embodiment of the invention the thermal barrier shall consist of a partition wall having openings for allowing the passage of water. In order to provide a good heat insulation said partition wall shall preferably be designed as a multi-partition wall having tranquil water between the separate walls.

The partitions will be heated by the gamma radiation from the core, and said heat will also prove beneficial in reducing the heat transfer from the surge volume to the water volume.

Figure 2:
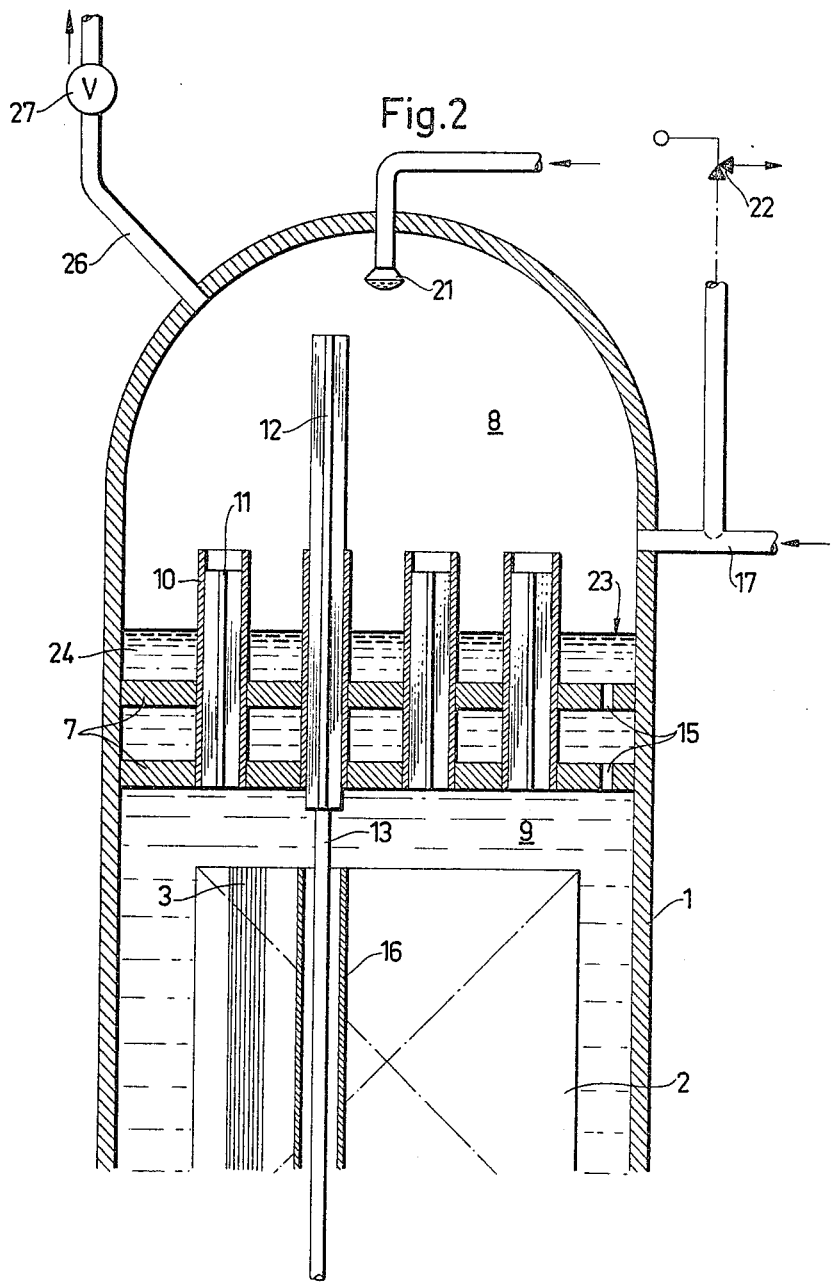

The invention will now be described with reference to the accompanying drawings. FIG. 1 illustrates a nuclear reactor according to the invention, and FIG. 2 illustrates on a larger scale the thermal barrier between the surge volume and the water volume.

The reactor comprises a pressure tank 1 which contains a core 2 for the nuclear fuel. The core contains a plurality of fuel elements 3 through which water flows in the indicated direction. For the sake of clarity only one fuel element is illustrated. The heated water leaves the reactor through a conduit 4, delivers its heat in a heat exchanger 5, and is pumped back to the reactor through a conduit 6.

The reactor tank contains a horizontal partition wall 7, dividing the tank into two portions, namely an upper portion 8 referred to in this specification as surge volume, and a lower portion 9 which is referred to as water volume and which contains the core 2. The partition wall 7 is, as is evident from FIG. 2, a dual partition wall. It contains a plurality of vertical pipes 10, extending some distance above the wall. Said vertical pipes 10 contain partitions 11 having a cruciform cross-section and dividing each pipe into four narrow vertical channels. One of said cruciform partitions, indicated 12, has a length greater than that of the pipe and is slidably mounted in the pipe. Said cruciform partition 12 is one of the neutron-absorbing control devices of the reactor and is fastened to the upper end of a drive rod 13 extending through a vertical channel 16 in the reactor core. For the sake of clarity only one control rod is illustrated. Said control rod is operated by a manoeuvring mechanism 14, the tube surrounding the cruciform partition 12 acting as guide.

The surge volume 8 of the reactor tank is connected by a conduit 17 to an electric boiler 18. The boiler 18 receives its feed water through a conduit 19 which is a branch from conduit 6. Conduit 19 is connected, via a conduit 20, to a spray nozzle 21 situated in the top of the reactor tank.

The dual partition wall 7 is mounted in the reactor tank at a level somewhat below the normal water level 23. Consequently, the surge volume 8 will, in normal operation, contain a body 24 of water. In addition to the openings defined by the pipes 10 the partition wall 7 contains openings 15 which will be referred to as breathing holes.

The pressurization means hitherto described operate as follows. Boiler 18 produces saturated steam having a considerably higher temperature than that of the water in water volume 9, and delivers said steam to surge volume 8. Simultaneously, comparatively cold water is sprayed into surge volume 8 through spray nozzle 21 in a medium quantity, regulated by a valve 25 in conduit 20. As a result, the temperature in surge volume 8, including the temperature of the body 24 of water, is higher than that of the water in water volume 9. Consequently, the pressure in the reactor tank 1 will be higher than the pressure of saturated steam having the temperature of the water in water volume 9. Therefore, no bulk boiling can occur in the water in water volume 9, or in the entire coolant system.

The parallel plates 7, with the body of tranquil water between them, will permit only a low and tolerable transfer of heat from the body 24 of water to the water in water volume 9.

Fresh water is perpetually supplied to the body 24 of water, originating from the condensation of steam and from the spray nozzle 21. In steady operation water flows from water volume 24 to body 9 through the breathing holes 15. Said breathing holes, however, do not suffice for allowing the passage of such a volume of water as results from a violent change of the total volume of water in the coolant system, such a change of volume having been referred to above as a surge. If such a surge occurs, the water will mainly flow through the pipes 10. Suppose, for instance, that the total volume of water decreases. The water in the vertical pipes 10 will be drawn down into the water volume 9, and a water level may temporarily be formed below the dual partition wall 7. This temporary lowering of the water level will result in a flash-off of the water in the body 24, which is at boiling temperature, and consequently the desired pressure will be maintained in the tank 1.

On occasions of abnormal operation of the reactor it may be desired to change rapidly the pressure in the pressure tank 1. A rapid increase of the pressure is obtained by closing the valve 25, whereas an opening of said valve to full capacity results in a rapid decrease of the pressure owing to an efficient condensation of the steam in surge volume 8 by the water from spray nozzle 21.

If it is judged necessary for the safe operation of the reactor to dissolve noncondensible gases in the reactor cooling water the physical separation of the pressurizing steam boiler and the condensing processes in the surge volume is of considerable practical advantage. The gases which are driven off in the boiler can only be reabsorbed in the condensing steam if the above mentioned separation is utilized. Thus it is possible to obviate the otherwise necessary frequent addition of gas to the reactor cooling water from an external source and the frequent release of gas from the steam space in the pressurizing steam boiler, a procedure necessary with certain other types of pressurization for pressure water reactors. It is known, for instance, that an addition of nitrogen to the reactor is useful for control of the pH-value of the water, owing to the fact that nitrogen is converted into ammonia. The steam boiler, when situated separate from the surge volume as illustrated, will not obstruct the circulation of the nitrogen through the cooling water system. If too much nitrogen has been added the excess can be released from the surge volume through a conduit 26 containing a valve 27.

What is claimed is:

1. A nuclear reactor of the pressurized water type, comprising a reactor tank, a space for water in the lower portion of said reactor tank, nuclear fuel in said water space, means for supplying pressurized water to said water space to be heated by said nuclear fuel, means for withdrawing heated pressurized water from said water space, a steam space in the upper portion of said reactor tank, means for producing steam having a temperature higher than that of the pressurized water and for supplying said steam into said steam space, and a thermal barrier situated below but near the normal operating water level in the reactor for reducing heat transfer from the steam space to the water space, said thermal barrier comprising a partition wall having openings therein for the free passage of water and other openings therein connected to tubes that extend above said normal operating water level in said reactor.

2. A nuclear reactor as claimed in claim 1, in which said partition wall is a multi-walled partition.

3. A nuclear reactor as claimed in claim 1, in which said tubes contain partitions dividing them into a plurality of parallel channels for reducing the circulation of the water in said tubes.

4. A nuclear reactor as claimed in claim 3, in which the partitions in at least one tube are slidable in said tube and consist of a neutron-absorbing control rod, said tube forming a guide for said control rod.

References Cited by the Examiner

UNITED STATES PATENTS

| 2,982,713 | 5/1961 | Sankovich et al. | 176—61 |
| 2,990,349 | 5/1961 | Roman | 176—61 X |
| 3,150,051 | 9/1964 | Ammon | 176—65 X |
| 3,161,571 | 12/1964 | Harrer et al. | 176—54 |

FOREIGN PATENTS 613,363   1/1961   Canada.

L. DEWAYNE RUTLEDGE, *Primary Examiner.*